United States Patent
Neumayer

(10) Patent No.: US 10,467,894 B2
(45) Date of Patent: Nov. 5, 2019

(54) METHOD FOR FINDING A PARKED VEHICLE IN A PARKING STRUCTURE, AND PARKING STRUCTURE

(71) Applicant: Audi AG, Ingolstadt (DE)

(72) Inventor: Thomas Neumayer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/078,412

(22) PCT Filed: Feb. 7, 2017

(86) PCT No.: PCT/EP2017/052612
§ 371 (c)(1),
(2) Date: Aug. 21, 2018

(87) PCT Pub. No.: WO2017/144263
PCT Pub. Date: Aug. 31, 2017

(65) Prior Publication Data
US 2019/0057599 A1 Feb. 21, 2019

(30) Foreign Application Priority Data
Feb. 27, 2016 (DE) .................. 10 2016 002 530

(51) Int. Cl.
*G08G 1/095* (2006.01)
*G08G 1/005* (2006.01)
(Continued)

(52) U.S. Cl.
CPC .......... *G08G 1/005* (2013.01); *G01C 21/206* (2013.01); *G01C 21/3661* (2013.01);
(Continued)

(58) Field of Classification Search
CPC .......... G08G 1/005; H04W 4/44; H04W 4/02; G01C 21/206; G01C 21/3661; G08B 7/066
See application file for complete search history.

(56) References Cited

U.S. PATENT DOCUMENTS 6,405,125 B1 * 6/2002 Ayed ...................... G01C 21/20
701/1
6,489,921 B1 * 12/2002 Wilkinson ......... G01C 21/3685
342/357.31
(Continued)

FOREIGN PATENT DOCUMENTS

| CN | 102625549 A | 8/2012 |
|---|---|---|
| CN | 102637369 A | 8/2012 |

(Continued)

OTHER PUBLICATIONS

English-language abstract of German Patent Application Publication No. DE 19923750 A1, published Nov. 25, 1999; 1 page.
(Continued)

*Primary Examiner* — Quang Pham
(74) *Attorney, Agent, or Firm* — Sterne, Kessler, Goldstein & Fox P.L.L.C.

(57) ABSTRACT

The disclosure relates to systems and methods for finding a parked vehicle in a parking structure, wherein a parked position of the vehicle is stored in a parking structure, a mobile terminal is coupled to the parking structure in order to provide a radio transmission path, navigation to the parked vehicle is requested from the parking structure using the mobile terminal, and the parking structure produces light trajectories in order to navigate a user to the parked position of the vehicle.

7 Claims, 2 Drawing Sheets

Figure 1:
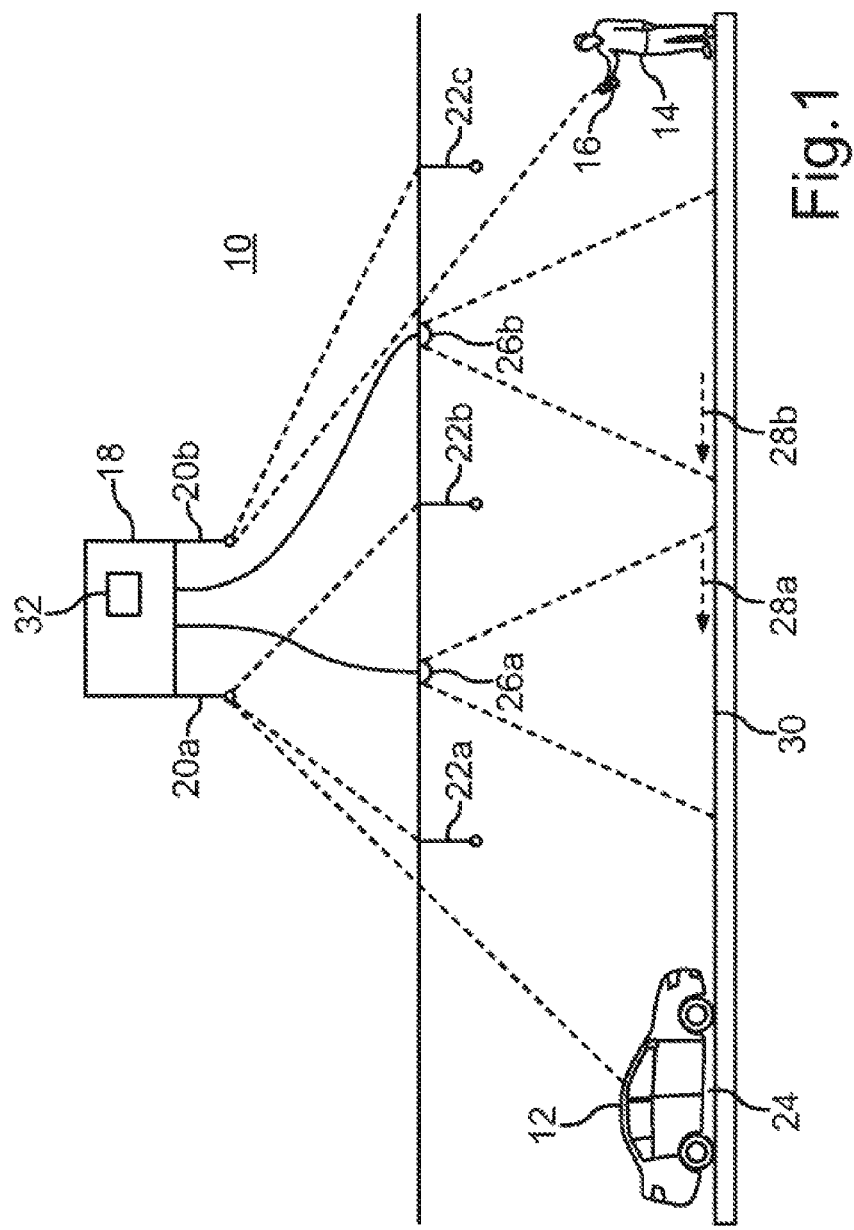

(51) Int. Cl.

| | | |
|---|---|---|
| *G01C 21/20* | (2006.01) | |
| *H04W 4/02* | (2018.01) | |
| *H04W 4/44* | (2018.01) | |
| *G01C 21/36* | (2006.01) | |
| *G08B 7/06* | (2006.01) | |

(52) U.S. Cl.
CPC .............. *G08B 7/066* (2013.01); *H04W 4/02* (2013.01); *H04W 4/44* (2018.02)

(56) References Cited

U.S. PATENT DOCUMENTS

| | | | | |
|---|---|---|---|---|
| 6,526,335 | B1* | 2/2003 | Treyz | G01C 21/26 701/1 |
| 6,650,999 | B1* | 11/2003 | Brust | B60R 25/102 340/932.2 |
| 6,909,964 | B2* | 6/2005 | Armstrong | G01S 5/0072 340/5.64 |
| 7,688,226 | B2* | 3/2010 | McCall | G08G 1/205 340/991 |
| 7,847,709 | B2* | 12/2010 | McCall | G08G 1/005 340/426.13 |
| 8,416,064 | B2* | 4/2013 | Leung | H04W 4/14 340/286.02 |
| 8,560,091 | B2 | 10/2013 | Reumerman et al. | |
| 9,041,556 | B2* | 5/2015 | Tucker | G01C 21/206 340/932.2 |
| 9,204,251 | B1* | 12/2015 | Mendelson | G08G 1/14 |
| 9,286,266 | B1* | 3/2016 | Fleck | G01C 21/20 |
| 9,606,241 | B2* | 3/2017 | Varoglu | G01S 19/48 |
| 9,664,522 | B2 | 5/2017 | Stadler | |
| 9,761,139 | B2* | 9/2017 | Acker, Jr. | G08G 1/144 |
| 9,965,960 | B1* | 5/2018 | McDavitt-Van Fleet | G06Q 10/00 |
| 9,975,483 | B1* | 5/2018 | Ramaswamy | B60Q 11/00 |
| 10,121,374 | B2* | 11/2018 | Kazemi | G08G 1/144 |
| 2006/0267799 | A1* | 11/2006 | Mendelson | G08G 1/14 340/932.2 |
| 2009/0098907 | A1* | 4/2009 | Huntzicker | G01C 21/12 455/556.1 |
| 2009/0276236 | A1* | 11/2009 | Adamczyk | G08G 1/127 705/1.1 |
| 2010/0073201 | A1* | 3/2010 | Holcomb | G08G 1/005 340/990 |
| 2010/0085214 | A1* | 4/2010 | Kim | G08G 1/14 340/932.2 |
| 2010/0198498 | A1* | 8/2010 | Jansen | G01C 21/26 701/533 |
| 2012/0176255 | A1* | 7/2012 | Choi | G06Q 10/00 340/989 |
| 2012/0200430 | A1 | 8/2012 | Spahl | |
| 2012/0265434 | A1* | 10/2012 | Woodard | G08G 1/144 701/423 |
| 2013/0103200 | A1 | 4/2013 | Tucker et al. | |
| 2015/0002292 | A1* | 1/2015 | Cavalcanti | G08B 21/0211 340/539.12 |
| 2015/0223013 | A1* | 8/2015 | Park | H04W 8/02 455/41.2 |
| 2015/0289111 | A1* | 10/2015 | Ozkan | H04W 4/04 455/456.1 |
| 2016/0379495 | A1* | 12/2016 | Engelen | G08G 1/005 340/932.2 |
| 2017/0089717 | A1* | 3/2017 | White | G01C 21/3658 |
| 2017/0135179 | A1* | 5/2017 | Balazs | H05B 37/0227 |
| 2017/0336516 | A1* | 11/2017 | Berkovich | H04W 8/22 |

FOREIGN PATENT DOCUMENTS

| | | |
|---|---|---|
| CN | 204086950 U | 1/2015 |
| DE | 19923750 A1 | 11/1999 |
| DE | 102016002530 A1 | 8/2017 |
| EP | 1234735 A1 | 8/2001 |
| WO | WO 2009/122356 A1 | 10/2009 |
| WO | WO 2015/004581 A1 | 1/2015 |
| WO | WO 2017/144263 A1 | 8/2017 |

OTHER PUBLICATIONS

English-language abstract of German Patent Application Publication No. DE 102016002530 A1, published Aug. 31, 2017; 6 pages.
English-language abstract of International Patent Application Publication No. WO 2017144263 A1, published Aug. 31, 2017; 1 page.
International Search Report and Written Opinion of the International Searching Authority directed to related International Patent Application No. PCT/EP2017/052612, dated May 11, 2017, with attached English-language translation; 22 pages.
International Preliminary Report on Patentability directed to related International Patent Application No. PCT/EP2017/052612, dated Feb. 14, 2018, with attached English-language translation; 24 pages.

* cited by examiner

METHOD FOR FINDING A PARKED VEHICLE IN A PARKING STRUCTURE, AND PARKING STRUCTURE

TECHNICAL FIELD

The present disclosure relates to a method for finding a parked vehicle in a parking structure, wherein the method comprises the following steps: A parked position of the vehicle is stored in a parking structure. A mobile terminal is coupled to the parking structure in order to provide a radio transmission path. Navigation to the parked vehicle is requested from the parking structure using the mobile terminal. The first two steps can also be executed in reverse order. The present disclosure also relates to a parking structure for finding a parked vehicle in the parking structure, comprising a memory apparatus for storing a parked position of the vehicle, and a communication interface which is designed to communicate with a mobile terminal via a radio transmission path.

Parking structures in accordance with the present disclosure refer particularly to parking lots and parking garages.

BACKGROUND

A method of the type in question for finding a parked vehicle in a parking structure, and a parking structure of the type in question is known from US 2013/0103200 A1. This document relates particularly to a method for localizing a vehicle parked in a parking garage by means of transmitting detected vehicle location information to a parking garage central computer. The position of the mobile terminal at the time of the parking of the vehicle can be compared with the parked position, wherein the mobile terminal transmits said position to the parking garage central computer. According to a different version, the vehicle is associated with a mobile terminal and the vehicle transmits the parked position to the parking garage central computer. After the user returns to the parking garage, navigation to the parked vehicle is requested from the parking garage central computer using the mobile terminal. Said parking garage central computer subsequently transmits navigation instructions to the mobile terminal which then displays navigation information for the user, for example, by means of a touchscreen, in order to navigate the user to the vehicle. This approach is disadvantageous due to the fact that for the successful finding of the vehicle, the map shown on the mobile terminal must be correctly understood, interpreted, and its information implemented. This requires visual thinking which is not present to this extent in a considerable portion of the population. It is further disadvantageous that a radio communication between the mobile terminal and the parking garage central computer must be ensured continuously in order to display on the mobile terminal a representation adjusted to the movement of the user. In said document, it is further proposed to provide navigation information to the user in the form of sentence instructions, for example, "Go to the third level," or "Go 60 feet to the left." Errors can also occur during the implementation of such instructions, particularly if the user is located in an unknown parking garage, is distracted when implementing the instructions, or has orientation problems.

A device and a method for finding a parked vehicle is also known from DE 199 23 750 A1. In this case, the position of the vehicle is determined during parking by a navigation system and transmitted from the vehicle to a mobile terminal and stored therein. The transmitted position information can be read on the mobile terminal and displayed on a display unit. The position information comprises street names and street numbers, coordinates of the location or a street map with location display. A variation is proposed, in which the position of the vehicle is stored in a buffer outside of the vehicle. This document also contains the disadvantages described in connection with US 2013/0103200 A1. In addition, a functional navigation system is required for storing a vehicle position and navigating a user to the parked vehicle. For the current systems, this means that the requirements for the functioning of a GPS (Global Positioning System) must be fulfilled. However, particularly in the area of parking garages and obscured areas, this is frequently not the case, and so the possible applications are limited.

EP 1 234 735 A1 addresses the problem of a car search on a parking lot, on which not every individual parking space is marked. By means of a portable terminal, the leaving of the motor vehicle is detected and the last position recorded. For finding the motor vehicle, the position is displayed on the portable terminal as geographic information, for example, the shortest or fastest route to the motor vehicle. This approach also exhibits the disadvantages described in connection with US 2013/0103200 A1. In addition, as already described as disadvantage in connection with DE 199 23 750 A1, a functioning navigation system is required, for example, a GPS.

From DE 10 2009 031 019 A1, a method for providing personalized navigation information for guiding is known, wherein a distinct identification information and a target information are associated with a person, and sensors determine the current position of said person. For displaying the personalized navigation information, display devices are integrated in the floor on a path of the person.

Therefore, embodiments of the present disclosure addresses the problem of developing a method of the type in question and a parking structure of the type in question such that a finding of a parked vehicle in the parking structure is made as reliable as possible.

BRIEF DESCRIPTION OF DRAWINGS/FIGURES

Figure 2:
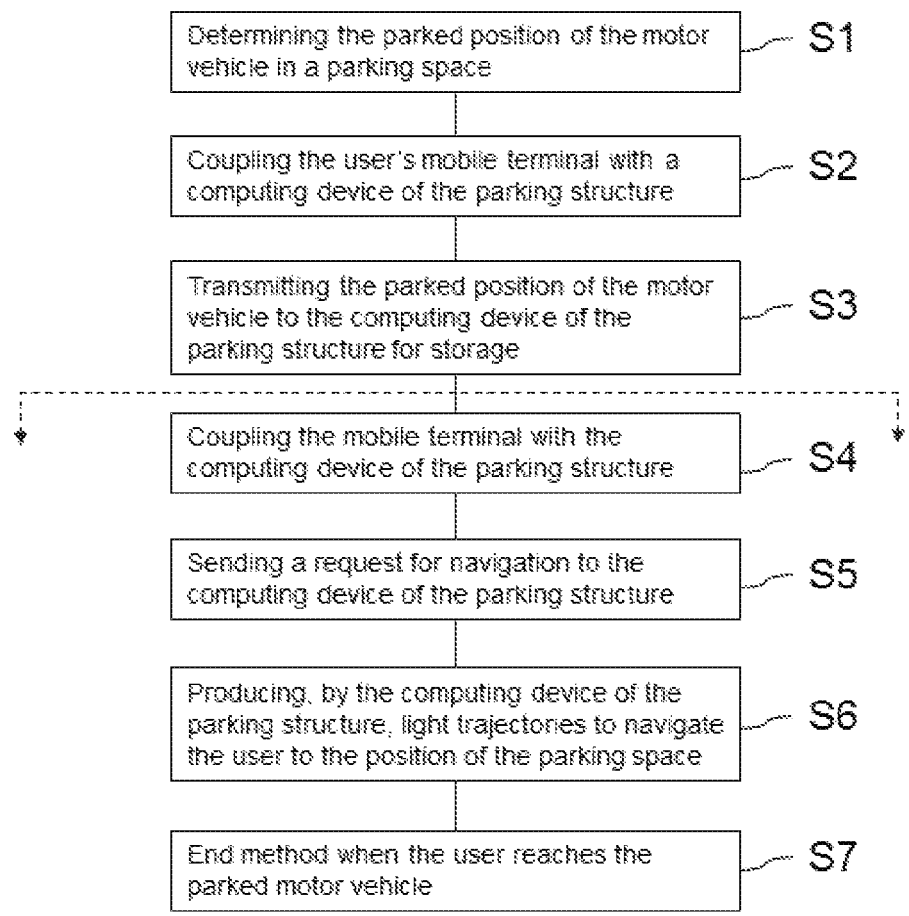

FIG. 1 depicts a schematic representation of an embodiment of a parking structure according to embodiments of the present disclosure that interacts with a vehicle and a mobile terminal for implementing the method according to embodiments of the present disclosure; and FIG. 2 depicts a signal flow graph for an example method according to embodiments of the present disclosure.

DETAILED DESCRIPTION

Embodiments of the present disclosure are based on the knowledge that a particularly reliable navigating of a user to the user's vehicle is made possible if errors during the implementation of navigation instructions by the user can be by and large excluded. For this reason, the navigation instructions displayed on a mobile terminal according to conventional techniques for finding a parked vehicle in a parking structure as described above appear to be disadvantageous. Therefore, the present disclosure proposes to display the navigation instructions in the form of light trajectories produced by the parking structure in order to navigate a user to the parked position of the vehicle. Light trajectories refer to optical navigation aids for the user which are produced by the parking structure. For example, they can be optical signals projected onto the floor or at least one wall of the parking structure, for example, stationary or running arrows, pictograms, for example, with depictions of persons in motion, and the like. In this manner, the possibility of navigating the user step by step to the user's vehicle is provided. The user only has to follow the light trajectories projected in front of said user in order to reach the vehicle without having to read a map or instructions.

Since it is possible to provide the possibility of tracking the user during the following of the light trajectories, they can be adjusted to the user's speed of movement. As a result, going astray is almost impossible. This ensures that the user finds the vehicle again in a highly reliable manner. Even persons with poor visual thinking can in this manner be safely guided to their motor vehicle.

According to embodiments of the present disclosure, a multiplicity of light sources of the parking structure are correspondingly controlled for producing the light trajectories. For that purpose, it is possible to particularly use projectors or headlights with suitable aperture attachments, and the like. According to embodiments of the present disclosure, the light sources already present for illuminating the parking structure are developed such that they can also be used for producing the light trajectories within the scope of the method according to embodiments of the present disclosure. This is possible in a simple manner because only individual light sources of all those present have to be used for producing light trajectories, while the remaining light sources can continue to provide the function of illuminating the parking structure. This results in a particularly cost-efficient implementation of the method according to embodiments of the present disclosure.

An example embodiment is characterized in that the parked position of the vehicle is determined by the mobile terminal and transmitted to the parking structure. For that purpose, the mobile terminal can be designed to communicate with wireless sensors of the parking structure. For example, this includes sensors that are designed to communicate with the mobile terminal on the basis of WLAN or Bluetooth. Alternatively, the parked position can be stored during the assignment of the target parking space for a parking pilot function in the parking structure. Further alternatively, the vehicle can determine the parked position together with the parking garage structure, for example, using automatic navigation in the vehicle on the basis of accelerations and so-called wheel ticks and a comparison with a map of the parking structure. This means that the parked position of the vehicle is transmitted by the vehicle, and transmitted from the vehicle to the parking structure or from the vehicle via the mobile terminal to the parking structure.

Circumstances permitting, the parked position can of course be determined redundantly by an interaction of mobile terminal and/or vehicle and/or parking structure.

It is particularly advantageous if the parking structure is designed to produce different light trajectories for different users. As a result, several users can be navigated simultaneously to their vehicle, even if the navigation paths intersect.

In this context, it is preferred if the light trajectories for different users differ from one another in terms of different light patterns and/or different colors. If LEDs are used as the light sources, it is particularly simple to produce light trajectories with different colors with one and the same light source because a plurality of LEDs, which emit in different wavelength ranges, is usually used for producing white light.

An example embodiment is characterized in that the parking structure also follows the path of the user along the light trajectories, particularly by means of sensors of the parking structure that communicate with the mobile terminal, or by means of camera systems of the parking structure, and adjusts the production of the light trajectories with regard to their local extension to the current position of the user. As a result, the risk of an erroneous navigation can be further reduced. In particular, the number of users to be navigated simultaneously to their vehicles can be further increased.

In this context, it is advantageous if the production of the light trajectories with regard to their local extension is adjusted to the current position of the user such that the corresponding light trajectories are produced only in a definable area around the user, particularly in an area between 1 and 20 m in front of the user on the path to the parked vehicle. Particularly preferred is an area between 2 m and 5 m in front of the user.

Further embodiments are disclosed in the dependent claims.

To the extent to which they may be applicable, embodiments of the present disclosure apply accordingly to a parking structure according to embodiments of the present disclosure for finding a parked vehicle in the parking structure. The parking structure according to embodiments of the present disclosure is characterized by a multiplicity of light sources for producing the light trajectories.

Embodiments of the present disclosure relate to the problem of finding a vehicle parked in a parking structure. Vehicles are usually parked in any desired individual parking spaces of a parking structure, wherein the individual parking space is either selected by the driver, or the driver is directed to a specific individual parking space by the parking structure. The driver must remember said parked position in order to be able to find the vehicle again after the user's return to the parking structure.

In a schematic depiction, FIG. 1 shows an embodiment of a parking structure 10 according to embodiments of the present disclosure (in this example, a parking garage) that interacts with a motor vehicle 12 and a mobile terminal 16 carried along by a user 14. The mobile terminal 16, for example, can be a Smartphone, a tablet computer, a PDA (Personal Digital Assistant), a laptop, or the like. The parking structure 10 comprises a computer 18, for example, a server, that is coupled with wireless communication interfaces 20a, 20b in order to communicate with the motor vehicle 12 and the mobile terminal 16 via a wireless radio transmission path.

There are different options for storing the parked position of the motor vehicle 12 in a memory apparatus 32 provided in the computer 18 of the parking structure 10. According to a first version, the computer 18 can specify a parked position for the driver 14, when entering the parking structure 10, for example, by providing a parking space number or the location of a specific individual parking space 24. The computer 18 can support the driver in the search for the predetermined parked position through piloting.

According to a different version, wireless or wired sensors 22a to 22c are provided in the parking structure 10, which track the motor vehicle 12 after entering the parking structure 10, until it has reached a specific individual parking space 24 and is parked there. The determined position of the individual parking space 24 is subsequently transmitted in a wireless or wired manner by the sensor 22 last concerned to the central computer 18. However, it can also be provided that the motor vehicle 12, proceeding from a fixed position, when entering the parking structure 10, for example, the entrance barrier, determines the position of the individual parking space 24, on which the motor vehicle 12 will eventually be parked, on the basis of accelerations and so-called wheel ticks and a comparison with a previously downloaded map of the parking structure 10.

Then, the motor vehicle 12 can wirelessly transmit the determined position via an onboard communication interface, for example, WLAN or Bluetooth, via a sensor 20 to the computer 18. Alternatively, the position determined by the motor vehicle 12, as described above, can be transmitted to the mobile terminal 16, carried along in the motor vehicle 12 by the user 14, wherein the mobile terminal 16 subsequently transmits the position of the individual parking space 24, in which the motor vehicle 12 is parked, via a sensor 20 to the computer 18. Further alternatively, the mobile terminal 16 can communicate with the sensors 22 and thus determine the position of the individual parking space 24, in which the motor vehicle 12 was parked, and subsequently transmit said position via a sensor 20 to the computer 18. As is apparent for a person skilled in the art, further versions are conceivable without deviating from the basic principle of the present disclosure.

In the computer 18, the position of the individual parking space 24, in which the motor vehicle 12 is parked, is also assigned to the mobile terminal 16 of the user 14. Alternatively, the license plate number of the motor vehicle can be assigned to the position of the individual parking space 24.

Once the position of the individual parking space 24, in which the motor vehicle 12—on whatever path—was parked, was stored in the computer 18 of the parking structure 10, the user 14 can leave the parking structure 10.

After the return of the user 14 to the parking structure 10, the mobile terminal 16, for providing a radio transmission path, is coupled via a sensor 20 with the computer 18 of the parking structure 10, for example, online via Audi Backend. Subsequently, via the mobile terminal 16, the user 14 requests navigation to the parked motor vehicle 12, for example, by means of an app associated with the parking structure 10. Due to the previously executed assignment of the mobile terminal 16 of the user 14 as well as the position of the individual parking space 24, in which the motor vehicle 12 is parked, the computer 18, according to known algorithms, for example, Google Maps, can determine particularly the shortest or quickest way from the current position of the user 14 to the individual parking space 24, in which the motor vehicle 12 is parked. Alternatively, the user 14 enters the license plate number of the motor vehicle 12 in the mobile terminal 16 for transmission to the computer 18. Based on the previously executed assignment of license plate number, individual parking space 24, the computer 18 can subsequently start the navigation.

The current position of the user 14 can be determined by tracking via the sensors 22 of the user 14 himself/herself or in that the radio signal of the mobile terminal 16 is evaluated by different sensors 22 and the current position of the user 14 is assigned to the position of the sensor 22 that receives the strongest signal. Alternatively, it can also be provided that the user 14 is prompted at a definable position of the parking structure 10 to request navigation to the individual parking space 24, wherein the location of said prompting is used as a starting point of the navigation.

The computer 18 subsequently produces control signals for controlling light sources 26a, 26b of the parking structure 10 such that light trajectories 28a, 28b are produced in order to navigate the user 14 to the position of the individual parking space 24. For that purpose, the parking structure 10 comprises a multiplicity of light sources 26 that are controlled correspondingly. Included is also the situation, in which the starting position of the user 14 lies on a different level of the parking structure 10 than the position of the individual parking space 24. In such case, the user 14 is guided by means of light trajectories 28 to an elevator, wherein the elevator can be controlled by the computer 18. When a sensor 22 arranged in the elevator detects that the user 14 has entered the elevator, the computer 18 guides the elevator to the level of the parking structure 10, on which the individual parking space 24 is located.

The computer 18 is designed to control the light sources 26 such that they produce different light trajectories 28 for different users 14. They can differ from one another in different light patters and/or different colors. Preferably, the light trajectories 28 are projected onto the floor 30 of the parking structure 10, but they can also be projected onto the walls. The floor 30 is preferred because an open structure does not have sidewalls everywhere. The light sources 28 are preferably arranged on ceilings of the parking structure 10.

The parking structure 10 can follow the path of the user 14 along the light trajectories 28, particularly via sensors 22 that track the user 14 or communicate with the mobile terminal 16. This allows for the computer 18 to adjust the production of the light trajectories 28 with regard to their local extension to the current position of the user 14. In this context, it is preferred that the light trajectories 28 are produced only in a definable area around the user 14, particularly in an area between 1 and 20 m, preferably between 2 m and 5 m, in front of the user 14 on the path to the parked motor vehicle 12.

FIG. 2 shows a schematic depiction of the sequence of an embodiment of a method according to the disclosure: In step S1, the position of the individual parking space 24 of the motor vehicle 12 in the parking structure 10 is initially determined. In this embodiment, the motor vehicle 12 determines its position and transmits it wirelessly, for example, via WLAN or Bluetooth, to the mobile terminal 16 of the user 14.

In step S2, the mobile terminal 16 of the user 14 is coupled via a sensor 20 with the computer 18 of the parking structure 10 for providing a radio transmission path. Via said radio transmission path, the mobile terminal 16 transmits the position of the individual parking space 24, in which the motor vehicle 12 is parked, to the computer 18, where it is subsequently stored in step S3.

After the return of the user 14 to the parking structure 10, steps S4 to S7 are executed. In step S4, the mobile terminal 16 is once again coupled with the computer 18 of the parking structure 10. In step S5, the mobile terminal 16 sends a request to the computer 18 of the parking structure 10 for navigation to the parked motor vehicle 12. In step S6, the parking structure 10, particularly the computer 18, produces light trajectories 28 by means of a corresponding control of the light sources 26 in order to navigate the user 14 to the position of the individual parking space 24. The method ends with S7, when the user 14 reaches the parked motor vehicle 12.

The invention claimed is:

1. A method for finding a parked vehicle in a parking structure performed by a central computer of the parking structure, the method comprising:
   storing, by the central computer, a parked position of the parked vehicle in the parking structure,
   coupling, by the central computer, a mobile terminal, carried by a user of the parked vehicle, to the parking structure in order to provide a radio transmission path via one or more sensors coupled to the central computer, requesting, by the mobile terminal, navigation to the parked vehicle from the central computer of the parking structure, responsive to the request for the navigation to the parked vehicle, determining, by the central computer, a current position of the mobile terminal based on the radio transmission path via the one or more sensors coupled to the central computer, determining, by the central computer, a path from the current position of the mobile terminal to the stored parked position, and producing, by the central computer of the parking structure, light trajectories in order to navigate the user to the parked position of the vehicle, wherein the light trajectories are produced based on the determined path from the current position of the mobile terminal to the stored parked position, wherein a multiplicity of light sources of the parking structure are correspondingly controlled for producing the light trajectories, and wherein the light sources present for illuminating the parking structure are developed such that they can be used for producing the light trajectories, wherein the central computer of the parking structure follows the determined path of the user along the light trajectories via the one or more sensors communicating with the mobile terminal using the radio transmission path and the production of the light trajectories with regard to their local expansion is adjusted to the current position of the user such that the corresponding light trajectories are only produced in a definable area around the user.

2. The method according to claim 1, further comprising:
determining, by the mobile terminal, the parked position of the vehicle, and
transmitting, by the mobile terminal, the parked position of the vehicle to the central computer of the parking structure using the radio transmission path via the one or more sensors.

3. The method according to claim 1, further comprising:
determining, by the vehicle, the parked position of the vehicle, and
transmitting, by the vehicle, the parked position of the vehicle to the central computer of the parking structure directly or via the mobile terminal using the radio transmission path via the one or more sensors.

4. The method according to claim 1, wherein the parking structure produces different light trajectories for different users.

5. The method according to claim 4, wherein the light trajectories for different users differ from one another in different light patterns and/or different colors.

6. The method according to claim 1, wherein the production of the light trajectories with regard to their local expansion is adjusted to the current position of the user such that the corresponding light trajectories are only produced in an area between 1 m and 20 m in front of the user on the determined path to the parked vehicle.

7. A parking structure for finding a parked vehicle in the parking structure, comprising:
a central computer,
a memory apparatus for storing a parked position of the parked vehicle, and
a communication interface comprising one or more sensors connected to the central computer and being configured to communicate with a mobile terminal associated with a user of the parked vehicle via a radio transmission path,
wherein the central computer of the parking structure is configured, following a request for navigation to the parked vehicle via the communication interface from the mobile terminal, to determine a current position of the mobile terminal based on the radio transmission path via the one or more sensors, determine a path from the current position of the mobile terminal to the stored parked position, and to produce light trajectories in such a manner that the user is navigated to the parked position of the vehicle, wherein the light trajectories are produced based on the determined path from the current position of the mobile terminal to the stored parked position, wherein the parking structure has a multiplicity of light sources for producing the light trajectories, and wherein the light sources present for illuminating the parking structure are developed such that they can be used for producing the light trajectories,
wherein the central computer of the parking structure follows the determined path of the user along the light trajectories via the one or more sensors communicating with the mobile terminal using the radio transmission path and to adjust the production of the light trajectories with regard to their local expansion to the current position of the user such that the corresponding light trajectories are only produced in a definable area around the user.

* * * * *